United States Patent
Lu et al.

(10) Patent No.: US 12,445,269 B2
(45) Date of Patent: Oct. 14, 2025

(54) SYSTEM AND METHOD OF APPLICATION RESOURCE BINDING

(71) Applicant: THALES DIS CPL USA, INC., Austin, TX (US)

(72) Inventors: HongQian Karen Lu, Austin, TX (US); Feng Shahab Pan, San Ramon, CA (US); Kyoungbong Koo, Fremont, CA (US); Pablo Blasco Herrero, Alicante (ES)

(73) Assignee: THALES DIS CPL USA, INC., Austin, TX (US)

( * ) Notice: Subject to any disclaimer, the term of this patent is extended or adjusted under 35 U.S.C. 154(b) by 368 days.

(21) Appl. No.: 17/966,968

(22) Filed: Oct. 17, 2022

(65) Prior Publication Data

US 2024/0129110 A1    Apr. 18, 2024

(51) Int. Cl.
*H04L 9/08* (2006.01)
*H04L 9/32* (2006.01)

(52) U.S. Cl.
CPC .......... *H04L 9/0819* (2013.01); *H04L 9/0866* (2013.01); *H04L 9/3249* (2013.01)

(58) Field of Classification Search
CPC .... H04L 9/0819; H04L 9/0866; H04L 9/3249
See application file for complete search history.

(56) References Cited

U.S. PATENT DOCUMENTS

| | | | | |
|---|---|---|---|---|
| 3,618,028 | A * | 11/1971 | Johnson | G06F 11/2236 714/E11.166 |
| 3,701,984 | A * | 10/1972 | Burns | G06F 12/0864 365/231 |
| 7,356,709 | B2 | 4/2008 | Gunyakti et al. | |
| 7,395,438 | B2 | 7/2008 | Parks et al. | |
| 7,546,334 | B2 * | 6/2009 | Redlich | G06F 21/6263 709/219 |
| 7,921,287 | B2 * | 4/2011 | Sprigg | G06F 21/805 713/165 |
| 7,996,669 | B2 | 8/2011 | Pearson et al. | |
| 8,745,579 | B2 | 6/2014 | Johnson, Jr. et al. | |
| 8,776,216 | B2 | 7/2014 | Boccon-Gibod et al. | |

(Continued)

OTHER PUBLICATIONS

International Search Report (PCT/ISA/2010) & Written Opinion (PCT/ISA/237) mailed by ISA/EP on Feb. 5, 2024 for corresponding International Application pursuant to the PCT, N∘PCT/US2023/0035267 (16 pages).

(Continued)

*Primary Examiner* — Michael W Chao

(57) ABSTRACT

A system and method for protecting an application resource file (RF) when a client uses an application on a host can include the steps by the application on the host of binding the RF to the host during execution of the application on the host by obtaining a device fingerprint of the host, verifying a signature by using the RF, the device fingerprint of the host, and a public key, where the signature was created during or at one of the following: a) an installation of the application at the host by signing the RF and the device fingerprint of the host using a private key corresponding to the public key; (b) an application provider before the installation of the application at the host; or (c) a client device; and where the method further uses the RF if a verification of the signature is successful.

14 Claims, 4 Drawing Sheets

(56) References Cited

U.S. PATENT DOCUMENTS

| | | | |
|---|---|---|---|
| 10,382,473 B1* | 8/2019 | Ashkenazy | H04L 63/1466 |
| 10,609,070 B1* | 3/2020 | Farmer, III | H04L 63/126 |
| 10,616,072 B1* | 4/2020 | Lo | H04L 41/22 |
| 10,735,420 B2* | 8/2020 | Tak | H04L 63/0815 |
| 10,846,374 B2 | 11/2020 | Nikitin et al. | |
| 10,893,066 B1* | 1/2021 | Oliphant | H04L 63/1441 |
| 10,938,850 B2* | 3/2021 | Tamir | G06F 21/577 |
| 11,151,225 B2 | 10/2021 | Desai et al. | |
| 11,409,851 B2* | 8/2022 | Lu | G06F 21/84 |
| 11,429,364 B2* | 8/2022 | Schutt | G06F 21/64 |
| 11,500,534 B2* | 11/2022 | Xu | G06V 40/67 |
| 11,516,222 B1* | 11/2022 | Srinivasan | G06F 21/577 |
| 11,604,857 B2* | 3/2023 | Adjedj | H04W 12/71 |
| 11,750,643 B1* | 9/2023 | Imrem | H04L 63/1433 |
| 12,086,234 B2* | 9/2024 | Vijayvargiya | G06F 21/53 |
| 12,321,470 B2* | 6/2025 | Motomiya | H04L 9/0866 |
| 2003/0037237 A1* | 2/2003 | Abgrall | H04L 63/062 713/166 |
| 2004/0078565 A1* | 4/2004 | Hofmeister | G06F 21/51 713/182 |
| 2004/0162989 A1* | 8/2004 | Kirovski | G06F 21/64 713/189 |
| 2006/0010497 A1* | 1/2006 | O'Brien | G06Q 10/10 726/26 |
| 2007/0094735 A1* | 4/2007 | Cohen | H04L 63/168 713/188 |
| 2008/0016357 A1* | 1/2008 | Suarez | H04L 63/0823 713/176 |
| 2010/0037065 A1* | 2/2010 | Dayka | G06F 21/57 713/187 |
| 2014/0007215 A1* | 1/2014 | Romano | H04L 63/0281 726/12 |
| 2014/0066015 A1* | 3/2014 | Aissi | H04W 4/60 455/411 |
| 2015/0213253 A1* | 7/2015 | Miranda | G06F 21/51 726/17 |
| 2015/0356560 A1* | 12/2015 | Shastry | G06Q 20/405 705/64 |
| 2017/0063975 A1* | 3/2017 | Prakash | H04L 67/1001 |
| 2017/0262656 A1* | 9/2017 | Salmon-Legagneur | G06F 21/57 |
| 2018/0068118 A1* | 3/2018 | Vandergeest | G06F 21/55 |
| 2018/0091977 A1* | 3/2018 | Lu | H04W 12/08 |
| 2018/0114000 A1* | 4/2018 | Taylor | H04L 9/0643 |
| 2018/0359244 A1* | 12/2018 | Cockerill | H04L 63/105 |
| 2019/0245686 A1* | 8/2019 | Rahimi | G06F 21/72 |
| 2020/0036703 A1* | 1/2020 | Håkansson | H04L 63/0876 |
| 2020/0119920 A1* | 4/2020 | Kohli | G06F 8/61 |
| 2021/0114558 A1* | 4/2021 | Cheng | H04W 12/069 |
| 2021/0192017 A1* | 6/2021 | Aigner | G06F 21/123 |
| 2021/0349986 A1* | 11/2021 | Jiang | H04L 9/3247 |
| 2022/0374521 A1* | 11/2022 | Liu | G06F 21/575 |
| 2023/0060782 A1* | 3/2023 | Wang | G06F 21/45 |

OTHER PUBLICATIONS

Anonymous: "What is hardware-locked licensing and why use LimeLM", Sep. 26, 2022 (Sep. 26, 2022), XP093120259, Retrieved from the Internet: URL:https://web.archive.org/web/20220926041502/https://wyday.com/limel.m/features/why/#why-limel.m; [retrieved on Jan. 16, 2024]; p. 6, l.ine 9—p. 7, line 4 p. 8, l.ine 7—p. 11, l.ine 3; p. 12, line 18—p. 13, line 5.

Agrawal Shashank et al: "White-Box Cryptography with Global. Device Binding from Message-Recoverable Signatures and Token-Based Obfuscation"; XP093119768, ISSN: 0302-9743 ISBN: 978-3-031-29496-9; vol. 13979, pp. 241-261, DOI: 10.1007/978-3-031-29497-6_12, Retrieved from the Internet: URL:https://eprint.iacr.org/archive/2021/767/1623219810.pdf>; p. 1,l1-p. 2, l10; p. 9, l8-p. 11, 17; p. 20, 11-p. 21,l26 p. 28, line 1—p. 32, line 17.

* cited by examiner

300

SYSTEM AND METHOD OF APPLICATION RESOURCE BINDING

CROSS-REFERENCE TO RELATED APPLICATIONS

Not applicable.

TECHNICAL FIELD

The present disclosure generally relates to providing security and authentication for software. More particularly, but not exclusively, the present disclosure relates to binding an application resource to an application at a host, or to the host itself, or to a customer or client device that runs or installs an application and the application resource on the host.

BACKGROUND

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

Cryptography is increasingly deployed in applications that are executed on open devices (such as PCs, tablets or smartphones). The open nature of these systems makes the software extremely vulnerable to attacks, since the attacker may obtain complete control over the execution platform and the software implementation itself. This means that an attacker can easily analyze the binary code of the application, and the corresponding memory pages during execution, the attacker can intercept system calls, tamper with the binary and its execution, and use any kind of attack tool such as IDA Pro, debuggers, emulators, etc. Such an attack context is known as white box attack context.

The challenge that white-box cryptography aims to address is to implement a cryptographic algorithm in software in such a way that cryptographic assets remain secure even when subject to white-box attacks.

Therefore, white-box cryptography (WBC) is an essential technology in any software protection strategy. This technology allows cryptographic operations without revealing any portion of confidential information such as the cryptographic key. Without this, attackers could easily grab secret keys from the binary implementation, from memory, or intercept information that would lead to disclosure at execution time.

WBC could be seen as a special purpose code generator that turns a given cipher into a robust representation. A representation where the operations on the secret key are combined with random data and code, in such a way that the random data cannot be distinguished from key information.

WBC is primarily used for protecting mobile applications. For such purposes, a WBC library can have a built-in device-key binding protection for mobile devices. The WBC library does not have a more generic device binding to other computer hosts. Thus, use of WBC when a customer or client uses a host or a number of hosts to run their application or application can still be vulnerable to a number of attacks.

The licensing of software provides some resolution, but still has many shortfalls in terms of convenience, cost of implementation, and remaining vulnerabilities. For example, software licensing of software typically requires a user entry of a license key, for example, a string of 16 letters or numbers. Furthermore, software license typically rely on a license server that further requires the application or a license agent to contact the license server to decide if the application can be used. See U.S. patent Ser. No. 10/846,374 granted on Nov. 24, 2020 to Microsoft Technology Licensing, LLC that has some of these shortcomings.

Some other techniques can be used, but still fail to overcome the unique vulnerabilities and new problems presented and resolved by the present embodiments as further detailed in the detailed description below. Some other methods and systems that attempt to solve the problems presented herein can include In U.S. Pat. No. 7,356,709 granted on Apr. 8, 2008 to Microsoft Technology Licensing LLC, a unique volume license key (VLK) is provided to a volume license holder. A signed file containing the VLK and the data derived from volume license holder's submitted computing environment information is provided to the volume license holder along with the licensed software. The license file is stored in a central location, such as on an installation server, or locally on client machines, in a rather large file of any type. Upon logon, the license file is read, the data authenticated and the system is activated. If license data cannot be authenticated, a connected system either fully functions in grace period or run in reduced functionality mode until authentication succeeds. If the system is disconnected, the system is functional only with disconnected features until it joins a network again. In a completely off-line installation, the license file is generated by the volume license holder using software vendor assigned specific VLK and software vendor provided security hardware device. The distribution methods of software package, the VLK, and the license file can be flexible, including, but not limited to, single or multiple media. Such system still fails to protect application resource files and further fails to account for the context where a license holder uses a number of host devices to install and run their licensed applications and further store their application resource files.

A number of other technologies such as U.S. Pat. No. 7,356,709 granted on Jul. 1, 2008 to Microsoft Corporation and U.S. Pat. No. 8,776,216 granted on Jul. 8, 2014 to Intertrust Technologies Corporation disclose digital rights management techniques that still fail to protect application resource files and further fail to account for the context where a license holder uses a number of host devices to install and run their licensed applications and further store and access their application resource files.

SUMMARY

Note that the term "client" or "client device" as used in this application can mean any computing device or computing or network infrastructure residing at or coupled to a customer's premise or location that can allow a customer to initiate an operation either by physical intervention or by some automatic programmatic function. Similarly, the term "host" or "host device" typically refers to computing device typically coupled or controlled to a certain extent by a customer or client that uses the host or host device.

In some embodiments, a method for protecting an application resource file when a client device uses an application on a host device, can include the steps by the host device or the application on the host of binding the application resource file to the host device during installation of the application on the host device. The binding of the application resource file to the host device during installation on the host can occur by creating an asymmetric key pair including a private key and a public key, obtaining a device fingerprint of the host device, signing the application resource file and the device fingerprint of the host device using the private key to provide a signature, saving the signature and the public key, and deleting the private key and the device fingerprint where the application resource file is usable only if a verification of the signature is successful.

In some embodiments, the method further includes the steps during execution of the application on the host device of obtaining the device fingerprint of the host device, verifying the signature, and using the application resource file if the verification succeeded.

In some embodiments, the method further includes the steps during execution of the application on the host device of obtaining the device fingerprint of the host device and verifying the signature by using the application resource file, the device fingerprint of the host device, and the public key.

In some embodiments, the step of verifying the signature (S) of the resource file (RF) and the host fingerprint (F1) is done by decrypting the signature (S) using an application's public key resulting in a first hash (H1) of the resource file and host fingerprint, obtaining the host fingerprint (F2) from the host, computing a second hash (H2) of the resource file and the host fingerprint (F2) obtained from the host, perform an exclusive OR function among the resource file, the first hash, and the second hash to provide a result K, and when the first hash equates to the second hash, then the result K equals the resource file and the application runs correctly.

In some embodiments, when the first hash does not equate to the second hash, then the result K does not equal the resource file and the application provides a wrong result or does not work.

The method described herein generally protect the application resource file from unauthorized usage.

In some embodiments, a method can be applied broadly in various scenarios for binding an application resource file in various contexts where the main differences between the various contexts involve when a signature is created. The contexts can include a first context when a signature is created during installation of the application for binding an application resource file to an application during execution of the application. A second context can involve when a signature is created at an application provider before installation (of the application at a host), where the application resource file is then bound to a host or a particular number of specific hosts for a customer or client. In a third context, a signature is created at a customer site such that the application resource file is bound to the customer where the binding is to specific hosts (even though the customer ultimately runs the application on one or more hosts).

In some embodiments where all three contexts above are at least contemplated, a method for protecting an application resource file when a client uses an application on a host device can include the steps by the application on the host device of binding the application resource file to the host device during execution of the application on the host device by obtaining a device fingerprint of the host device, verifying a signature by using the application resource file, the device fingerprint of the host device, and a public key, where the signature was created during or at one of the following:
 a) an installation of the application at the host device by signing the application resource file and the device fingerprint of the host device using a private key corresponding to the public key;
 (b) an application provider before the installation of the application at the host; or
 (c) a client device; and
where the method further uses the application resource file if a verification of the signature is successful.

In some embodiments, the host device saves the signature and public key and further deletes the private key and the device fingerprint during the installation of the application.

In some embodiments, the step of verifying the signature (S) of the resource file (RF) and the host fingerprint (F1) is done by decrypting the signature (S) using a client's public key resulting in a first hash (H1) of the resource file and host fingerprint, obtaining the host fingerprint (F2) from the host, computing a second hash (H2) of the resource file and the host fingerprint obtained from the host, perform an exclusive OR function among the resource file, the first hash, and the second hash to provide a result K, and when the first hash equates to the second hash, then the result K equals the resource file and the application runs correctly.

In some embodiments where the application resource file is bound to a host, the method can further bind the host device by including the steps at the application provider of creating by the application provider a key pair for digital signature, providing a public key of the application provider with the application, and including or defining the device fingerprint of the client device or host device or both within the application, where the client device provided the host device finger print to the application provider via user interface or via an application programming interface.

In some embodiments where the application resource file is bound to a host, the method can further include the steps at the application provider of generating the application resource file, creating a digital signature of the application resource file and the host device fingerprint using the application provider's private key, and attaching the digital signature with the application resource file.

In some embodiments where the application resource file is bound to a customer, the method can further include the steps at the client device of requesting a fingerprint from a host device, receiving the fingerprint from the host device, signing the resource file and fingerprint to form a signature, sending the application, the resource file, the signed fingerprint configuration file, the signature of the resource file and fingerprint, and customer certificate before running the application on the host. Note, The fingerprint configuration file specifies attributes or definition of fingerprint. It is signed by the application provider. The client device signs the resource file and fingerprint.

In yet other embodiments where the application resource file is bound to a customer, the method further comprises at the client device for each host device of obtaining a device fingerprint specified in a fingerprint configuration file, creating a digital signature of the application resource file and the device fingerprint, pushing the application, the application resource file, the fingerprint configuration file, the client certificate, and the digital signature to the host, and further including steps at each host device. Such steps at each host device can include verifying the customer certificate using the public key, verifying the fingerprint configuration file using a public key of the application provider, verifying the signature of the application resource file and device fingerprint using a public key of the client, and using the application resource file if the verification succeeds.

In some embodiments, a system for protecting an application resource file when a client device uses an application on a host device can include one or more processors, a memory coupled to the one or more processors, the memory containing computer instructions which when executed causes the one or more processors on the host device or the application to perform a number of steps. The steps, functions or operations can include binding the application resource file to the host device during installation of the application on the host device by creating an asymmetric key pair including private key and a public key, obtaining a device fingerprint of the host device, saving a signature and the public key, and deleting the private key and the device fingerprint, where the application resource file is usable only if a verification of the signature is successful.

In the context of binding the application resource file to the application, in some embodiments, the one or more processors are further configured to perform the steps during execution of the application on the host device of obtaining the device fingerprint of the host device, verifying the signature, and using the application resource file if the verification succeeded.

Again in the context of binding the application resource file to the application, in some embodiments the one or more processors are further configured to perform the steps during execution of the application on the host device of obtaining the device fingerprint of the host device and verifying the signature by using the application resource file, the device fingerprint of the host device, and the public key.

In some embodiments, signing the application resource file and the device fingerprint of the host device using the private key provides or creates a signature.

In some embodiments, the step of verifying the signature (S) of the resource file (RF) and the host fingerprint (F1) can include decrypting the signature (S) using a public key resulting in a first hash (H1) of the resource file and host fingerprint, obtaining the host fingerprint (F2) from the host, computing a second hash (H2) of the resource file and the host fingerprint (F2) obtained from the host, performing an exclusive OR function among the resource file, the first hash, and the second hash to provide a result K, and when the first hash equates to the second hash, then the result K equals the resource file and the application runs correctly.

In some embodiments, the client device downloads the application resource file and where during a key rotation process, the application signs the application resource file and the device fingerprint of the host device.

In some embodiments, the device fingerprint of the host device includes unique information about the host device including network connections and environmental settings.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
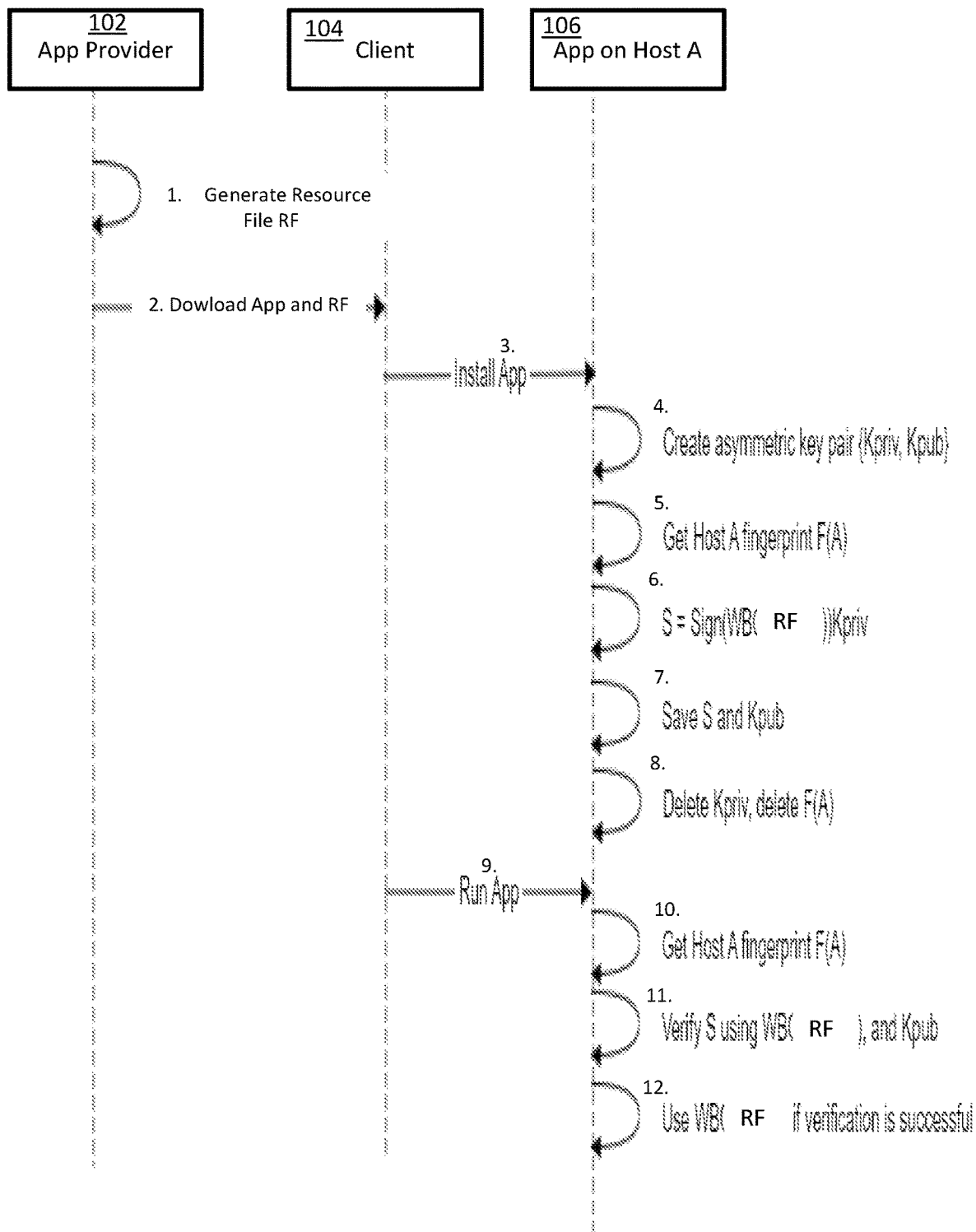
FIG. 1 illustrates a system and method of binding an application resource file to an application when executing an application at a host device in accordance with the embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

Applications (e.g. software appliances and agents) installed on host computers, especially those for security purposes, have secret keys for protecting their own secrets and/or customer data, and for connecting servers or other entities. Typically, there is a 'root' key that other secrets or keys rely on or are derived from. Protecting this root key is critically important to the security of the application. However, this is a very difficult problem due to the needs for automation, desires of convenience by customers and vendors/application providers alike, and a lack of control to customer environments by the vendors or application providers. As a result, this root key is often hard-coded in the software itself and all installations of the application have the same key. If this key is compromised via, for example, reverse engineering, all of the same applications that may be residing on other host devices could be exposed.

One way to solve this problem is to use a version of White Box Cryptography (WBC), which overcomes shortcomings of existing WBC technologies. With one variety of the implementation, the WBC key file is outside of the WBC library.

While it is not possible to extract the original secret key from WBC key file, it might not be impossible from a compromised host to gain access to a stolen disk of another host if the two hosts had a same WBC key file. These embodiments provide a way to address the problem. As used herein, a WBC key file can be synonymous with an application resource file (RF).

To solve the problem mentioned above, the embodiments can bind the WBC key file to a host computer. The embodiments also disclose three methods called Application or App binding, host binding, and customer binding, respectively. Each of the methods may address different deployment and usage scenarios.

All three methods use the same method for verifying the signature of the WBC key file and the fingerprint, but use different keys.

Signature Verification

Given a public key corresponding to a private key that signed the WBC key file (or application resource file) and the fingerprint, the Application does the following:

Decrypts the signature using the public key resulting the hash H1 of the WBC key file and device fingerprint F1

Gets device fingerprint F2 from the device

Computes hash H2 of the WBC key file and device fingerprint F2

Checks if H1==H2. Only if the Hashes match, application then uses the WBC key file or application resource file.

Method 1. App Binding

This method may be used in a scenario where the Application provider or customers do not want or are not capable of managing certificate signing for device fingerprints.

Setup:

1. The App defines device fingerprint (it knows what device information it has access to).
2. There is a WBC key file for an application release or a customer.

With further reference to the system 100 of FIG. 1, such a system 100 includes an application provider 102, a client or customer 104, and an application 106 configured to run on a host device 106 such as "Host A". In such a system, the method can involve at the application provider 102 a step 1 where an application resource file is generated such as a WBC key file. At a client device or customer 104 at step 2, the method downloads the application and application resource file (RF). At step 3, the client 104 initiates the installation of the application and application resource file at a host.

During the App installation on a host, the application 106 at step 4 Creates an asymmetric key pair {Kpriv, Kpub}, at step 5 Gets device fingerprint F, at step 6 Signs the {WBC key file, F} using Kpriv, at step 7 Saves the signature and public key Kpub, and at step 8 delete the private key Kpriv and F.

During application execution at step 9, the application at step 10 gets the Host A fingerprint F(A) (and similarly fingerprint for Host B F(B), etc.) and at step 11 verifies the signature of the application resource file and device fingerprint (for each host fingerprint) using the *Application's public key Kpub*. At step 12, the application uses the application resource file only if the verification succeeded.

This method is simple for both the Application developer and customer. It requires that the Application can get a good entropy source from the host in order to generate a quality key pair.

Note that if an attacker wanted to regenerate the signature via reinstallation, all the resources are already protected by the Application since the Application will become inaccessible during uninstallation.

How does this method mitigate the risk of the attack scenario described above? Since the signature is self-signed by the application, is it possible that the attacker makes and attempts the Application to regenerate the signature on Disk B when it is mounted to Host A? There are two opportunities where the signature may be regenerated: The first scenario is during application reinstall and the second would be during WBC key rotation that more generically would be an application resource file rotation (which can be an update or new version for a file). In both cases, the Application needs to decrypt the data (whatever it is) using the WBC key and re-encrypt using the same key or a different key. Because the host fingerprint does not match (going from one disk to another), the signature verification will fail, and the application will not be able to use the WBC key properly. The installation or key rotation will fail. Therefore, this method can mitigate the risk, and the attacker cannot re-generate a new signature.

Method 2. Host Binding

Figure 2:
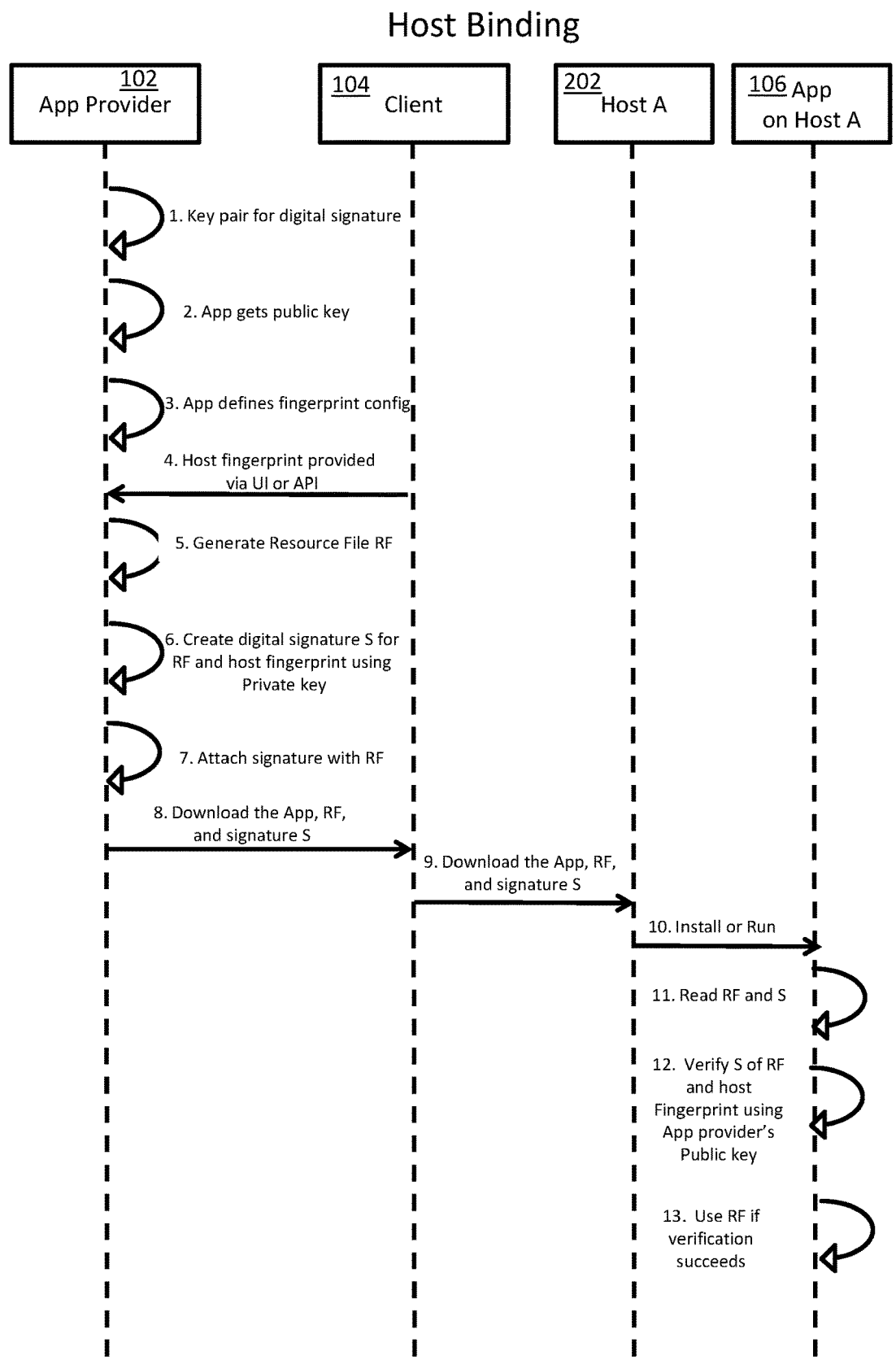
FIG. 2 illustrates a system and method of binding an application resource file to a host in accordance with the embodiments.

This method addresses the scenario where a customer has a relative small number of hosts and does not wants to deploy its own binding mechanism. Referring to FIG. 2, such a system 200 can include the application provider 102, the client device 104, a host 202 or "Host A", and an Application 106 on host 202.

Setup for the host binding method with further reference to FIG. 2:

1. The Application provider 102 has a key pair for digital signature at step 1.
2. The application (App) has or gets the Application Provider's public key at step 2.
3. The Application defines device fingerprint configuration (it knows what device information it has access to) at step 3.
4. The client/customer 104 provides the host device fingerprint via User Interface (UI) or via API to the application provider at step 4.

Accordingly, the Application provider will have a WBC key file (or application resource file) for an application release or for a customer.

With further reference to FIG. 2, the method of host binding can proceed with the application provider 102 generating the application resource file (or WBC key file) at step 5, creating a digital signature of the WBC key file (or application resource file) and the device fingerprint using its private key at step 6, and attaching the key signature with the key file at step 7.

At step 8, the client or customer 104 will download the Application, WBC key file (or application resource file), and signature. The client 104 at step 9 will further download the application, the application resource file and signature S to the host device 202. When a host 202 installs or runs the application at step 10, the method further has the steps at the application 106 of reading the key file and the key signature at step 11, and verifying the signature of the WBC key and device fingerprint using the App provider's public key at step 12. At step 13, the application 106 on host 202 uses the WBC key file if the verification succeeded.

Assuming that an attacker had compromised a host A that had the application installed and that the attacker also had stolen a disk B (or a snapshot or backup of the disk) of a host B, and that the attacker mounted the disk B to the host A. With the embodiments herein of host binding, the signature verification on host A (202) with the disk B from host B would fail, because the signature on the disk B is for the information that includes fingerprint of host B, which is different from that of host A. The attacker would not be able to access or use the information on disk B.

Method 3. Customer Binding

Figure 3:
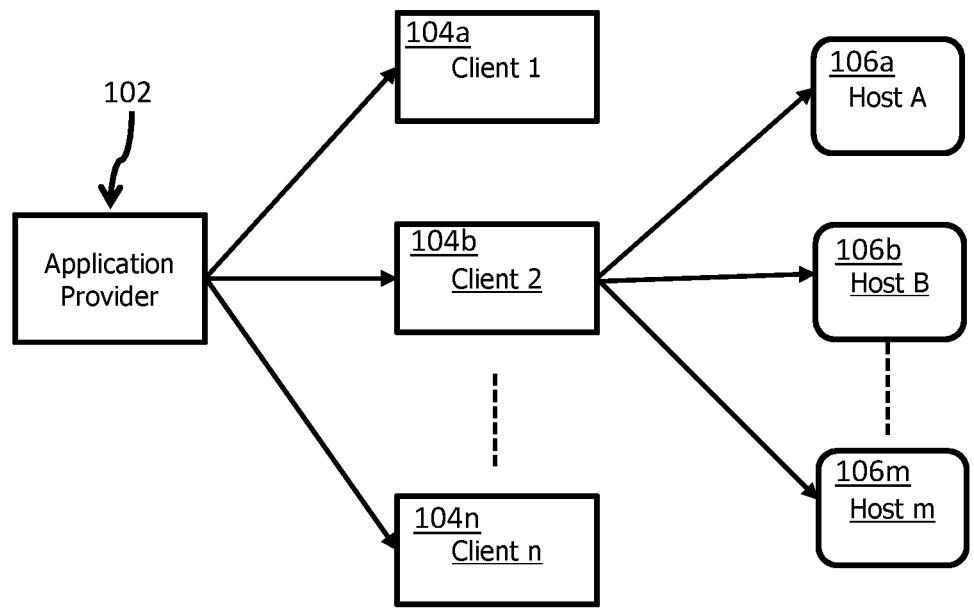
FIG. 3 illustrates a system or network where an application provider has a number of clients and each client further has a number of host where an application is installed and running in accordance with the embodiments.

This method applies to the deployment scenario where a customer or client has a large number of hosts or devices as illustrated in the system 300 of FIG. 3 where an application provider 102 has a number of customers or clients (104*a*, 104*b*, through 104*n*) and each client can have a number of host devices such as client 104*b* having host 106*a*, host 106*b* through host 106*m*. In this case, Method #2 for host binding is inconvenient. The customer also wants to download the same application once from application provider 102 rather than multiple times for each host that runs the application.

According, the setup would have the application provider having a key pair for digital signature and the application would have the application provider's public key(s).

Figure 4:
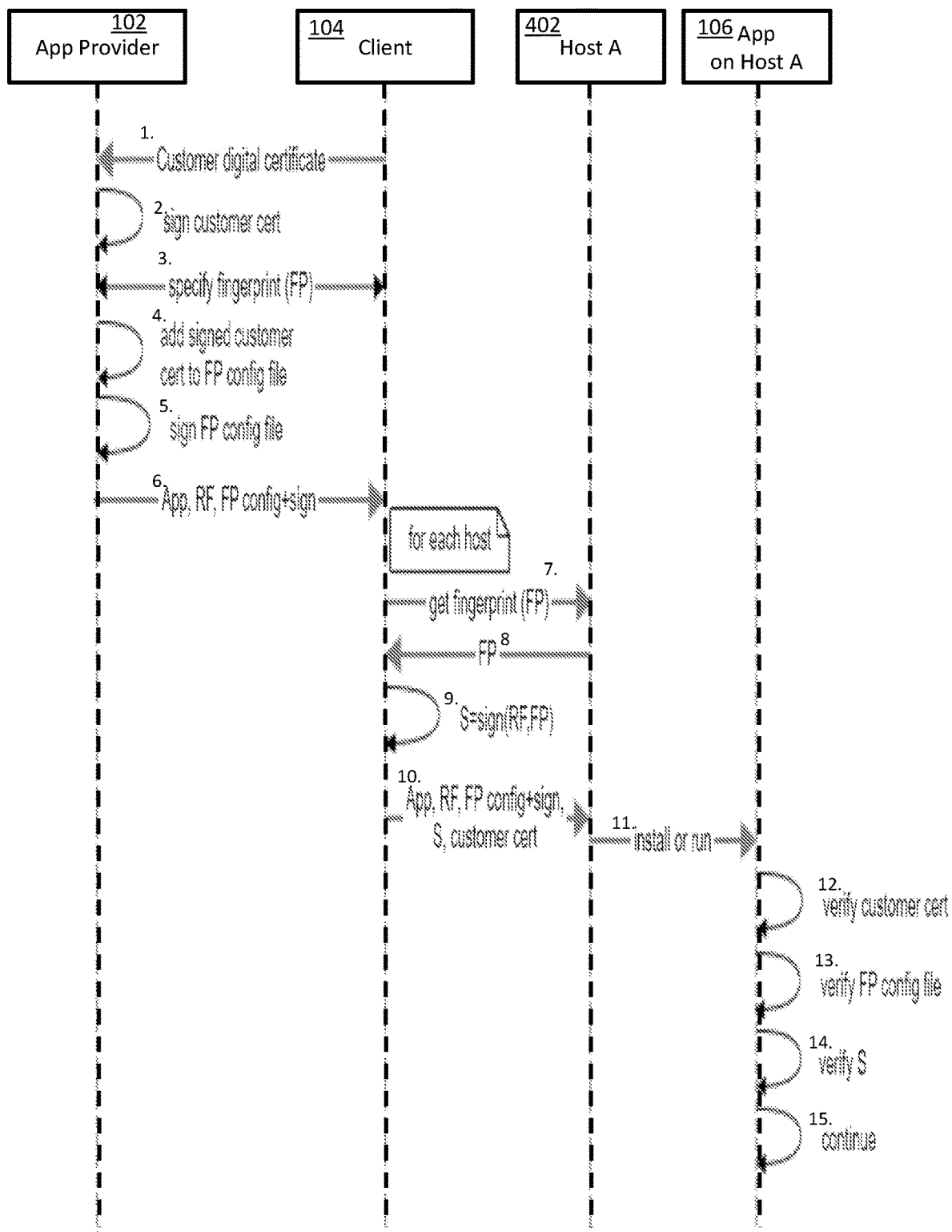
FIG. 4 illustrates the system and method of binding an application resource file to a customer in accordance with the embodiments.

With further reference to the system 400 in FIG. 4, such a system 400 can include the application provider 102, the client device 104, a host 402 or "Host A", and an Application 106 on host 402.

The method for customer binding accordingly would include at step 1 with the client/customer 104 requesting the application provider 102 to sign a digital certificate, for examples, by making a Certificate Signing Request (CSR) or uploading the digital certificate to an application provider server, which can sign the certificate. Accordingly, the application provider 102 at step 2 signs the customer certificate using the application provider's private signing key. At step 3, the Client may customize the fingerprint configuration at the application provider's server. The Application provider adds and configures the signed customer certificate to the application's fingerprint configuration file at step 4. At step 5, the Application provider 102 can sign the fingerprint configuration file with the Application Provider's Private key, which may be different from the certificate signing key. The Application provider can further generate the WBC key file or application resource file (not shown). At step 6, the client or customer 104 downloads the WBC key file or application resource file, the fingerprint configuration file, and the application package. Note that in some embodiments, each customer/client may have its own WBC key file or application resource file.

For each host 402, the Customer gets the device fingerprint specified in the fingerprint configuration file (e.g. MAC address, IP address, etc.) at step 7, receives the fingerprint from each host at step 8 and creates a digital signature of the resource file & device fingerprint at step 9. At step 10, the client 104 pushes the App package, WBC key file or resource file, fingerprint configuration file, customer certificate, and the signature to the corresponding host 402.

At step 11, the host 402 installs or runs the application 106. Accordingly, the application at step 12 the application 106 verifies the customer certificate using application provider's public key, at step 13, verifies the fingerprint configuration file using application provider's public key, which may be different from the key in step 12. At step 14, the application 106 verifies the signature of the WBC key (or application resource file) and device fingerprint using the Customer's public key. At step 15, the Application uses the WBC key file or application resource file if the verification succeeded.

Although the embodiments are presented as methods for binding an external WBC key file to a host of an application, the methods are applicable in general to binding software resources of an application (such as a resource file RF) to a host of that application.

For the correctness of the process and convenience of the customers, the application provider may provide a tool or tools for some of the works to be done on the customer side, e.g. define configuration, collect fingerprints, create signature, etc.

The attack scenario and mitigation that Method #3 provides are similar to Method #2.

Key Management

With Dynamic WBC, one approach is to generate and push out a new WBC key for each application release. The application manages the rotation of the WBC key from the old key to the new one.

Another approach is for application provider to host a WBC key server. Such server can generate WBC keys and manage access control. The WBC key can still be pushed out with each new release. In addition, a customer can get its own WBC key through the key server. In this case, the customer authenticates to the key server and downloads a new WBC key. The key can be signed or unsigned depending on which one of the three methods the customer is using.

For the Method #1 for application binding, the customer downloads a WBC key file. The Application will sign the key and the device fingerprints during the key rotation process.

For the Method #2 for host binding, the customer downloads a signed WBC key file. This includes the key and the signature of the key and device fingerprint.

For the Method #3 for customer binding, the customer downloads a WBC key file, and digitally signs the key and device fingerprints for each host.

The Application can update the WBC key using its key rotation mechanism.

Fingerprint

The fingerprint may be customizable via a fingerprint configuration file. The file may consist of types of attributes for fingerprinting, which are accessible from the host, for example, IP address, MAC address, disk ID, host name etc. The customization may be done by the application provider or authorized customers through the application provider (e.g., via an application provider web portal or API). Digital signatures by the application provider can enable the control and integrity protection of the fingerprint configuration file. In addition, the fingerprint configuration file may be encrypted.

The fingerprint may include unique information about the host/device. It may also include unique information about the environment or network that the host is connected to or have access to. Such network or environment information prevents adversaries from stealing a disk (or disk snapshot) from a host and configuring their own host in their own environment to create a same fingerprint.

Security controls must be in place to prevent adversaries from reconfiguring the host system. Such controls should be in place for any IT systems whether using the embodiments herein or not.

Automation

In a Cloud computing environment, a host may be a virtual machine (VM) or a container, which can be scaled up or down. For example, when needs increase, a customer's system may add a new VM instance. In this case, the system can implement the installation of Method #1 or steps 7-10 of Method #3 (FIG. 4) for the new VM. This process can be automated.

Side Channel Attack Prevention

In the methods description above, if H2 is the same as H1, the method uses the WBC library with the WBC key. Otherwise, the method does not continue the operation. The operation timing gives the indication of the correctness of the device fingerprint, which can be helpful to an attacker. The following is an alternative that mitigates this potential risk.

Let K=WBCkey XOR H1 XOR H2. Give K to the WBC library as the WBC key.

When H1==H2, K=WBCkey. The App runs correctly.

When H1 !=H2, K !=WBCkey. The WBC library still runs, but uses a wrong key and gives a wrong result.

The embodiments herein provide a method for binding an external resource of an application to the host computer that the application is running. The resource can only be used by the Application if the predefined conditions are satisfied. This prevents attackers from accessing the contents from stolen disks or disk snapshots.

Although there exists a WBC library that has built-in device-key binding protection for mobile devices, such WBC library does not have a more generic device binding to other computer hosts. The embodiments herein provide a more flexible and generic way to do the host binding.

The embodiments herein are novel and non-obvious as they did not exist before and existing methods failed to solve the stated problem. It is non-obvious for since the methods are not straightforward, require intricate knowledge of cryptography and application security, and is further based on understanding of software products and deployments that are not conventional client-server situations.

In some embodiments with reference to FIG. 1, a method 100 for protecting an application resource file when a client device 104 uses an application 106 on a host device, can include the steps by the host device or the application on the host of binding the application resource file to the host device during installation (step 3) of the application on the host device. The binding of the application resource file to the host device during installation on the host can occur by creating an asymmetric key pair including private key and a public key at step 4, obtaining a device fingerprint of the host device at step 5, signing at step 6 the application resource file and the device fingerprint of the host device using the private key to provide a signature, saving at step 7 the signature and the public key, and deleting at step 8 the private key and the device fingerprint where the application resource file is accessible only if a verification of the signature is successful at step 11.

In some embodiments, the method further includes the steps during execution (at step 9) of the application on the host device of obtaining at step 10 the device fingerprint of the host device, verifying the signature at step 11, and using the application resource file if the verification succeeded at step 12.

In some embodiments, the method 100 further includes the steps during execution of the application 106 on the host device of obtaining at step 10 the device fingerprint of the host device F(A) and verifying at step 11 the signature by using the application resource file (RF), the device fingerprint F(A) of the host device, and the public key (Kpub).

In some embodiments, the step of verifying (step 11) the signature (S) of the resource file (RF) and the host fingerprint (F1) is done by decrypting the signature (S) using an application's public key resulting in a first hash (H1) of the resource file and host fingerprint, obtaining the host fingerprint (F2) from the host, computing a second hash (H2) of the resource file and the host fingerprint (F2) obtained from the host, perform an exclusive OR function among the resource file, the first hash, and the second hash to provide a result K, and when the first hash equates to the second hash (H1==H2), then the result K equals the resource file and the application runs correctly.

In some embodiments, when the first hash does not equate to the second hash, then the result K does not equal the resource file and the application provides a wrong result or does not work.

The method described herein generally protects the application resource file from unauthorized usage.

In some embodiments, a method can be applied broadly in various scenarios for binding an application resource file in various contexts where the main differences between the various contexts involve when or where a signature is created. The contexts can include a first context when a signature is created during installation of the application for binding an application resource file to an application during execution of the application. A second context can involve when a signature is created at an application provider before installation (of the application at a host), where the application resource file is then bound to a host or a particular number of specific hosts for a customer or client. In a third context, a signature is created at a customer site such that the application resource file is bound to the customer (even though the customer ultimately runs the application on one or more hosts).

In some embodiments where all three contexts above are at least contemplated and with reference to FIGS. 1, 2, and 4, a method (100, 200, or 400) for protecting an application resource file when a client 104 uses an application 106 on a host device (202 or 404) can include the steps by the application on the host device of binding the application resource file to the host device during execution of the application on the host device by obtaining a device fingerprint of the host device (see FIG. 1, step 10, or FIG. 2, Step 11, FIG. 4, step 13), verifying a signature (see FIG. 1, step 11, FIG. 2, step 12, or FIG. 4, step 14) by using the application resource file, the device fingerprint of the host device, and a public key, where the signature was created during or at one of the following:

a) an installation of the application at the host device by signing the application resource file and the device fingerprint of the host device using a private key corresponding to the public key (see FIG. 1, see steps 4-6);

(b) an application provider before the installation of the application at the host (see FIG. 2, step 6); or (c) a client device (see FIG. 4, step 9); and where the method further uses the application resource file if a verification of the signature is successful.

In some embodiments with reference to FIG. 1, the host device saves the signature and public key (step 7) and further deletes the private key and the device fingerprint (at Step 8) during the installation of the application.

In some embodiments, the step of verifying the signature (S) of the resource file (RF) and the host fingerprint (F1) is done by decrypting the signature (S) using a client's public key resulting in a first hash (H1) of the resource file and host fingerprint, obtaining the host fingerprint (F2) from the host, computing a second hash (H2) of the resource file and the host fingerprint obtained from the host, perform an exclusive OR function among the resource file, the first hash, and the second hash to provide a result K, and when the first hash equates to the second hash, then the result K equals the resource file and the application runs correctly.

In some embodiments where the application resource file is bound to a host as illustrated by FIG. 2, the method 200 can further bind the host device by including the steps at the application provider 102 of creating (at step 1) by the application provider a key pair for digital signature, providing (at step 2) a public key of the application provider with the application, and including or defining (at step 3) the device fingerprint host device within the application, where the client device 104 provided (at step 4) the host device fingerprint to the application provider via user interface or via an application programming interface.

In some embodiments where the application resource file is bound to a host as illustrated in FIG. 2, the method 200 can further include the steps at the application provider 102 of generating (at step 5) the application resource file, creating (at step 6) a digital signature of the application resource file and the host device fingerprint using the application provider's private key, and attaching (at step 7) the digital signature with the application resource file.

In some embodiments where the application resource file is bound to a customer as illustrated in FIG. 4, the method 400 can further include the steps 7-10 at the client device of requesting a fingerprint from a host device, receiving the fingerprint from the host device, signing the resource file and fingerprint to form a signature, sending the application, the resource file, the signed fingerprint configuration file, the signature, and customer certificate before running at step 11 the application on the host.

In yet other embodiments where the application resource file is bound to a customer as again illustrated in FIG. 4, the method 400 further includes at the client device 104 for each host device of obtaining at step 7 a device fingerprint specified in a fingerprint configuration file, creating at step 9 a digital signature of the application resource file and the device fingerprint, pushing at step 10 the application, the application resource file, the fingerprint configuration file, the client certificate, and the digital signature to the host 402, and further including steps at each host device. Such steps at each host device 106 can include verifying at step 12 the customer certificate using the public key, verifying at step 13 the fingerprint configuration file using a public key of the application provider, verifying at step 14 the signature of the application resource file and device fingerprint using a public key of the client, and using at step 15 the application resource file if the verification succeeds.

In some embodiments with reference to FIG. 1, a system 100 for protecting an application resource file when a client device 104 uses an application on a host device can include one or more processors, a memory coupled to the one or more processors, the memory containing computer instructions which when executed causes the one or more processors on the host device or the application to perform a number of steps. The steps, functions or operations can include binding the application resource file to the host device during installation of the application on the host device by creating (at step 4) an asymmetric key pair including private key and a public key, obtaining (at step 5) a device fingerprint of the host device, saving (at step 7) a signature and the public key, and deleting (at step 8) the private key and the device fingerprint, where the application resource file is accessible only if a verification of the signature is successful at step 12.

In the context of binding the application resource file to the application with respect to FIG. 1, in some embodiments, the one or more processors are further configured to perform the steps during execution (step 9) of the application on the host device of obtaining at step 10 the device fingerprint of the host device, verifying at step 11 the signature, and using at step 12 the application resource file if the verification succeeded.

Again in the context of binding the application resource file to the application as illustrated in FIG. 1, in some embodiments the one or more processors are further configured to perform the steps during execution of the application on the host device of obtaining the device fingerprint of the host device and verifying the signature by using the application resource file, the device fingerprint of the host device, and the public key.

In some embodiments, signing the application resource file and the device fingerprint of the host device using the private key provides or creates a signature.

In some embodiments, the step of verifying the signature (S) of the resource file (RF) and the host fingerprint (F1) can include decrypting the signature (S) using an application's public key resulting in a first hash (H1) of the resource file and host fingerprint, obtaining the host fingerprint (F2) from the host, computing a second hash (H2) of the resource file and the host fingerprint (F2) obtained from the host, performing an exclusive OR function among the resource file, the first hash, and the second hash to provide a result K, and when the first hash equates to the second hash, then the result K equals the resource file and the application runs correctly.

In some embodiments, the client device downloads the application resource file and where during a key rotation process, the application signs the application resource file and the device fingerprint of the host device.

Note that the three methods disclosed above use different public keys to verify the signature of the resource file and the host fingerprint. In method #1 where application binding occurs at installation, verification of the resource file and host fingerprint uses the application's public key. In method #2 where binding for a host occurs at the application provider, verification of the resource file and host fingerprint uses the application provider's public key. In method #3 where binding occurs at the customer, verification of the resource file and host fingerprint uses the client's public key. Further note that verification of the signature of the resource file and the host fingerprint is separate and distinct from the verification of the signature for the client certificate or the fingerprint configuration file.

In some embodiments, the device fingerprint of the host device includes unique information about the host device including network connections and environmental settings.

In the absence of any specific clarification related to its express use in a particular context, where the terms "substantial" or "about" or "usually" in any grammatical form are used as modifiers in the present disclosure and any appended claims (e.g., to modify a structure, a dimension, a measurement, or some other characteristic), it is understood that the characteristic may vary by up to 30 percent.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device or processor may be transformed from a generic and unspecific computing device or processor to a combination device comprising hardware and software configured for a specific and particular purpose providing more than conventional functions and solving a particular technical problem with a particular technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide further embodiments.

The invention claimed is:

1. A method for protecting an application resource file when a client device uses an application on a host device, comprising the steps by the host or the application on the host of:
   binding the application resource file to the host device during an installation and subsequent execution of the application on the host device by:
   creating, during said installation, an asymmetric key pair including a private key and a public key;
   obtaining a device fingerprint of the host device;
   signing together both the application resource file and the device fingerprint of the host device using the private key to provide a signature;
   saving the signature and the public key; and
   deleting, during said installation, both the private key and the device fingerprint, thereby completing said installation,
   wherein the method further binds the host device by including the steps at the application provider of:
   creating by the application provider a key pair for digital signature;
   providing a public key of the application provider with the application; and
   including or defining the device fingerprint of the client device or host device or both within the application, wherein the client device provided the host device finger print to the application provider via user interface or via an application programming interface,
   wherein the method, after completing said installation, further comprises the steps during said execution of the application on the host device of:
   obtaining the device fingerprint of the host device;
   verifying the signature by using the application resource file, the device fingerprint of the host device, and the public key; and
   using the application resource file if the verification succeeded,
   wherein the application resource file is accessible only if a verification of the signature is successful.

2. The method of claim 1, wherein the step of verifying the signature (S) of the application resource file (RF) and the host fingerprint (F1) by:
   decrypting the signature (S) using an application's public key resulting in a first hash (H1) of the application resource file and host fingerprint;
   obtaining the host fingerprint (F2) from the host;
   computing a second hash (H2) of the application resource file and the host fingerprint (F2) obtained from the host;
   perform an exclusive OR function among the application resource file, the first hash, and the second hash to provide a result K; and
   when the first hash equates to the second hash, then the result K equals the application resource file and the application runs correctly.

3. The method of claim 2, when the first hash does not equate to the second hash, then the result K does not equal the application resource file and the application provides a wrong result or does not work.

4. The method of claim 1, wherein the method protects the application resource file from unauthorized usage.

5. A method for protecting an application resource file when a client device uses an application on a host device, comprising the steps by the application on the host device of:
   binding the application resource file to the host device during an installation and subsequent execution of the application on the host device by:
   during said installation,
   creating an asymmetric key pair including a private key and a public key;
   obtaining a device fingerprint of the host device;
   signing together both the application resource file and the device fingerprint of the host device using the private key to provide a signature;
   saving the signature and the public key; and
   deleting, during said installation, both the private key and the device fingerprint, thereby completing said installation,
   and during said execution,
   obtaining the device fingerprint of the host device;
   verifying the signature by using the application resource file, the device fingerprint of the host device, and the public key, wherein the signature was created during said installation of the application at the host device by signing the application resource file and the device fingerprint of the host device using the private key corresponding to the public key creating during said installation of the application, and
   using the application resource file if a verification of the signature is successful,
   wherein the method further binds the host device by including the steps at the application provider of:
   creating by the application provider a key pair for digital signature;
   providing a public key of the application provider with the application; and including or defining the device fingerprint of the client device or host device or both within the application, wherein the client device provided the host device finger print to the application provider via user interface or via an application programming interface.

6. The method of claim 5, wherein the step of verifying the signature (S) of the application resource file (RF) and the host fingerprint (F1) by:
   decrypting the signature (S) using a public key resulting in a first hash (H1) of the application resource file and host fingerprint;
   obtaining the host fingerprint (F2) from the host;
   computing a second hash (H2) of the application resource file and the host fingerprint obtained from the host;
   perform an exclusive OR function among the application resource file, the first hash, and the second hash to provide a result K;
   when the first hash equates to the second hash, then the result K equals the application resource file and the application runs correctly.

7. The method of claim 5, wherein the method further comprises the step at the application provider of:
   generating the application resource file;
   creating a digital signature of the application resource file and the host device fingerprint using the application provider's private key; and
   attaching the digital signature with the application resource file.

8. The method of claim 5, wherein the method further comprises the steps at the client device of:
   requesting a fingerprint from a host device;
   receiving the fingerprint from the host device;
   signing the resource file and fingerprint to form a signature;
   sending the application, the resource file, a fingerprint configuration file, the signature, and a customer certificate to the host before executing the application on the host.

9. The method of claim 8, wherein the method further comprises at the client device for each host device of:
   obtaining a device fingerprint specified in the fingerprint configuration file;
   creating a digital signature of the application resource file and the device fingerprint;
   pushing the application, the application resource file, the fingerprint configuration file, the client certificate, and the digital signature to the host;
and further comprising steps at each host device of
   verifying the customer certificate using the public key of the application provider;
   verifying the fingerprint configuration file using a public key of the application provider;
   verifying the signature of the application resource file and device fingerprint using a public key of the client; and
   using the application resource file if the verification succeeds.

10. A system for protecting an application resource file when a client device uses an application on a host device, comprising:
   one or more processors;
   a memory coupled to the one or more processors, the memory containing computer instructions which when executed causes the one or more processors on the host device or the application to perform the steps of:
      binding the application resource file to the host device during installation of the application on the host device by:
         creating an asymmetric key pair including a private key and a public key;
         obtaining a device fingerprint of the host device;
         saving a signature and the public key; and
         deleting the private key, and the device fingerprint,
      wherein the one or more processors are further configured to perform the steps during execution of the application on the host device of:
      obtaining the device fingerprint of the host device;
      verifying the signature by using the application resource file, the device fingerprint of the host device, and the public key; and
      using the application resource file if the verification succeeded,
   wherein the application resource file is accessible only if a verification of the signature is successful,
wherein an application provider binds the host device by:
   creating by the application provider a key pair for digital signature;
   providing a public key of the application provider with the application; and
   including or defining the device fingerprint of the client device or host device or both within the application, wherein the client device provided the host device finger print to the application provider via user interface or via an application programming interface.

11. The system of claim 10, wherein the signature is created by signing the application resource file and the device fingerprint of the host device using the private key to provide a signature.

12. The system of claim 10, wherein the step of verifying the signature (S) of the application resource file (RF) and the host fingerprint (F1) comprises:
   decrypting the signature (S) using an application's public key resulting in a first hash (H1) of the application resource file and host fingerprint;
   obtaining the host fingerprint (F2) from the host;
   computing a second hash (H2) of the application resource file and the host fingerprint (F2) obtained from the host;
   perform an exclusive OR function among the application resource file, the first hash, and the second hash to provide a result K;
   when the first hash equates to the second hash, then the result K equals the application resource file and the application runs correctly.

13. The system of claim 10, wherein the client device downloads the application resource file and wherein during a key rotation process, the application signs the application resource file and the device fingerprint of the host device.

14. The system of claim 10, wherein the device fingerprint of the host device includes unique information about the host device including network connections and environmental settings.

* * * * *